United States Patent [19]

Jourquin et al.

[11] Patent Number: 4,997,858

[45] Date of Patent: Mar. 5, 1991

[54] METHOD FOR PREPARING A FLEXIBLE POLYURETHANE FOAM

[75] Inventors: Lucien Jourquin, Wetteren; Eddie Du Prez, Brakel; Patrick Demeyer; Rudi Mortelmans, both of Ghent, all of Belgium

[73] Assignee: Recticel, Brussels, Belgium

[21] Appl. No.: 337,806

[22] Filed: Apr. 14, 1989

[30] Foreign Application Priority Data

Jun. 28, 1988 [BE] Belgium .............................. 8800740

[51] Int. Cl.$^5$ .............................................. C08G 18/14
[52] U.S. Cl. ..................................... 521/118; 521/130; 521/97; 521/131; 521/158; 521/905
[58] Field of Search ................. 521/118, 130, 97, 131, 521/158, 905

[56] References Cited

U.S. PATENT DOCUMENTS

| | | | |
|---|---|---|---|
| 3,879,315 | 4/1975 | Watkinson et al. | 521/131 |
| 4,139,686 | 2/1979 | Jabs et al. | 521/905 |
| 4,247,654 | 1/1981 | Wagner | 521/158 |

FOREIGN PATENT DOCUMENTS 2233345 3/1975 France.
126815 4/1982 Japan.

*Primary Examiner*—Maurice J. Welsh
*Attorney, Agent, or Firm*—Sughrue, Mion, Zinn, Macpeak & Seas

[57] ABSTRACT

A method for preparing a flexible polyurethane foam, wherein a polyether-polyol having an average molecular weight from 1000 to 8000 and an average functionality not larger than 4, is brought into reaction with an organic polyisocyanate in the presence of a foam stabilizer, a catalyst and blowing agent comprising methylformate, wherein a cross-linker/extender and/or amine catalyst with delayed action is added to said reaction mixture.

17 Claims, No Drawings

METHOD FOR PREPARING A FLEXIBLE POLYURETHANE FOAM

The invention relates to a method for preparing a flexible polyurethane foam, wherein a polyether-polyol having an average molecular weight from 1000 to 8000 and an average functionality not larger than 4, is brought into reaction with an organic polyisocyanate in the presence of a foam stabilizer, a catalyst and a blowing agent comprising methyl formate.

For the production of flexible polyurethane foams use is made of blowing agent which, in a large degree, determine the density and the hardness of the foam.

Besides the $CO_2$-gas which is liberated in a chemical way by the reaction of water and (poly)isocyanates, use is made of an additional physical blowing agent for a large number of different foam grades having a low density and/or a low hardness.

In the present production technology for preparing flexible polyurethane foam, trichlorofluoromethane ($CCl_3F$) is used as a physical blowing agent (and in a less measure methylenechloride $CH_2Cl_2$), which due to particular characteristics, leads to an optimum processability and optimal properties of the formed flexible polyurethane foam.

According to experts and to recent scientific studies hydrocarbons comprising chlorine and fluorine (among which $CCl_3F$) are amongst those which lead to a destruction of the ozone layer. In that case it is then almost sure that e.g., the use of $CCl_3F$ as a physical blowing agent in flexible polyurethane foam will be strongly limited in the future and may be forbidden.

The use of alkylalkanoate compounds with a molecular weight less than 74 as physical blowing agent for the production of flexble polyurethane foam is already known and is described in the U.S. Pat. No. 3,879,315.

In that U.S. Pat. No. 3,879,315 the accent is put on the use of a mixture comprising at the most 50% by weight methyl formate and at least 50% by weight $CCl_3F$ and especially on the use of an azeotropic mixture comprising 18% by weight methyl formate and 82% by weight $CCl_3F$ as a physical blowing agent in conventional flexible foam formulations, with the economical purpose of substituting a part of the $CCl_3F$ by methyl formate, due to which a larger gas volume per kg of blowing agent is obtained and thus an increase of the blowing efficiency (by unit of weight of physical blowing agent).

The use of pure methyl formate is only briefly mentioned in a single example, without mentioning the measured physical foam properties. In that sole example, splits have been observed in the foam.

From that patent it follows that, from an industrial point of view, it is required to still use a relatively important amount of hydrocarbons comprising fluorine and chlorine as a physical blowing agent in the conventional formulations for preparing flexible polyurethane foams, because the amount of methyl formate as a physical blowing agent may not exceed a certain limit due to the critical processability and the worse physical properties of the obtained product compared with a method wherein trichlorofluoromethane and/or methylene chloride is used as physical blowing agent.

The main object of the invention is to present a modified foam formulation enabling one to provide a solution to the drawbacks related to the use of a relatively high amount of methyl formate as a blowing agent.

For that purpose, a cross-linker/extender and/or an amine catalyst with delayed action is added to said reaction mixture of polyether-polyol, isocyanate, foam stabilizer, catalyst and a blowing agent comprising methyl formate.

In a more particular embodiment of the invention, use is made of a cross-linker/extender comprising a polyol having a molecular weight not larger than 400 and a functionality of at least 2 and 8 at the highest.

Thereby especially preference is given to glycerol, trimethylolpropane, ethylene glycol, propylene glycol, diethylene glycol, dipropyleneglycol and butanediol.

As an amine catalyst, use is preferably made, according to the invention, of an amine which is at least partially neutralised with a carboxylic acid, wherein that carboxylic acid reacts with an isocyanate or with the primary amine groups present in the reaction mixture for thus progressively liberating the amine as catalyst during the polyurethane foam forming.

Another amine catalyst with delayed action, which is also particularly suitable, is a so-called heat-sensible amine-catalyst of which the catalytic activity increases with increasing temperature.

Other particularities and advantages of the invention will become clear from the description given hereunder of e.g., some typical foam formulations according to the invention; this description is only given by way of example and does not limit the scope of the invention.

It is the object of this invention to present a method for preparing a flexible polyurethane foam wherein use is made, as a physical blowing agent, of methyl formate or of a mixture of methyl formate and a halogenated blowing agent such as trichlorofluoromethane and methylene chloride, whereby the largest part of that blowing means is formed by methyl formate.

Preference is even given to the use of pure methyl formate or of a mixture of methyl formate with a known not completely halogenated blowing agent as the only physical blowing agent, through which the use of trichlorofluoromethane can be completely eliminated from the production process.

It is indeed so that the known not completely halogenated blowing agent, except for some exceptions, do not have much influence on the destruction process of the ozone layer. Thereupon there is tried, according to the invention, to guaranty an optimal processability and to produce a polyurethane foam wherein the mechanical and comfort characteristics are comparable to those obtained by using trichlorofluoromethane as a physical blowing agent.

The invention more particularly relates to a method for preparing flexible polyurethane foam on the basis of conventional polyether-polyols which are produced as a slabstock or hot moulding.

According to the invention there has been established that, in order to guaranty a good processing, comparable with the one of a method wherein conventional physical blowing agents on the basis of hydrocarbons comprising chlorine and fluorine are used, fundamental formulation modifications are necessary which consists in adding a crosslinder/extender and/or a so-called amine catalyst with delayed action in determined amounts to the known foam formulations.

Further it has been established that, according to the invention, for obtaining a polyurethane foam with good physical properties, in particular with respect to the hardness and the compression sets, an excess of isocyanate, characterized by an isocyanate index larger than 100 and preferably comprised between 105 and 115, is preferred in the most foam formulations wherein thus an excess of methyl formate is used as physical blowing agent together with a crosslinker/extender and/or a so-called amine catalyst with delayed action.

The polyether-polyols which can be used in a method according to the invention are the same as the ones generally used for the production of flexible polyurethane polyether foams, and have in the most general case a molecular weight between 1000 and 8000 and a functionality not larger than 4. Comprised therein are the traditional polyether-polyols, poly-addition products of an alkylene oxide, such as propylene and/or ethylene oxide on a starter, such as ethylene glycol, trimethylolpropane, for the production of a flexible slabstock and active polyether-polyols with a higher content of primary hydroxyl groups for the production of a flexible hot moulding.

In most of the cases, the polyol can be a mixture of the above-mentioned polyols, however with an average molecular weight of that polyol laying between 1000 and 8000 and an average functionality not larger than 4.

Organic polyisocyanates correspond to the general formula $X(NCO)_i$, wherein i is at least equal to 2 and usually smaller than 6, and wherein X represents an aliphatic, cycloaliphatic or aromatic radical, whether or not substituted by a halogen or alkoxy group, of which toluenediisocyanate (2, 4 and 2, 6) and methylene diphenyldiso cyanates are the most principal. Also derivaties, pre-polymers (e.g., trimers) and mixtures of all those substances can be used in the here described method.

For the production of conventional flexible polyether foams, use is generally made of the 2,4- and 2,6-isomers of toluene diisocyanate or mixtures thereof.

Beside polyol and polyisocyanate, there is preferably present a chemical blowing agent which can be formed by water and/or another chemical compound, such as formic acid, which liberates $CO_2$ gas due to the reaction with polyisocyanates, which is responsable for a part of the foam forming.

The total foam forming is obtained by adding to those three components an additional physical blowing agent, which, in the present invention, consists for example of a mixture of methylformate with at least one of the following compounds: trichlorofluoromethane (R11), other known completly halogenated hydrocarbons, such as dichlorodifluoromethane, trichlorotrifluoroethane, dichlorotetrafluoroethane, known not completely halogenated hydrocarbons such as methylene chloride, ethyl chloride, bromoethane, 1,1,1-trifluoro 2,2-dichloroethane, 1,1,1,2-tetrafluoroethane, dichlorofluoroethane, chloro-1,2,2,2-tetrafluoroethane, chloropropene, 1-chloropropane, 2-chloropropane, wherein the concentration of the methylformate in the mixture is preferably at least 50% by weight.

For environmental reasons, preference is given to the use of pure methyl formate or a mixture of methyl formate with the known not completely halogenated blowing agent as the sole physical blowing agent.

As foam stabilizers conventional polyalkylsiloxanepolyether copolymers can be used and as catalysts the known amine and metal catalysts. If necessary additional products, such as fire retardants, fillers, pigments, anti-oxidants and other usable additives can be added to the formulation.

Essential to the method according to the invention, is the addition of cross-linker/extenders and/or of special amine catalysts with delayed action.

The cross-linker/extenders which are meant here are low molecular compounds with a molecular weight not higher than 400 and a functionality of at least 2, which can for example be chosen from the group of the following polyalcohols and/or completely substituted alkanolamines: glycerol, trimethylolpropane, ethylene glycol, propylene glycol, diethylene glycol, dipropylene glycol, butanediol and triethanolamine.

The functionality of at least 2 can also relate to at least 1 functional OH-group and at least 1 functional NH (or $NH_2$)-group or to at least 2 functional NH (or $NH_2$)-groups, in such a manner that the used cross-linker/extenders can comprise one or more alkanolamines, and/or polyamines, such as mono- and diethanolamine, di-isopropanolamine.

Alkyl substituted derivatives and alkylene-oxide poly-addition products can also be used for the above-mentioned cross-linker/extenders.

The amine catalysts with delayed action which are applied, according to the invention, can be divided into two categories: (a) amines which are partially or completely neutralized with carboxylic acids, which react with isocyanates or primary amine groups, and so liberate the amine as catalyst, and (b) thermosensitive amines, of which the catalytic activity increases exponentially with increasing temperatures, as a consequence of, for example, a reduction of the steric hinderance by increased flexibility, better accessibility of the nitrogen electron pair and reduced hydrogene bond.

Those amine catalysts are preferably used in quantities varying from 0.05 to 1.0 parts by weight for 100 parts polyol, while the cross-linker/extenders are used in a quantity of 0.1 to 3.0 parts for 100 parts polyol and preferably in a quantity of 0.3 to 0.7 parts for 100 parts polyol.

It is of course also possible to apply as a catalytic system as well a certain amount of cross-linker/extenders as a certain amount of the amine catalyst with delayed action described herebefore.

In the said physical blowing agent use is made in an advantageous way of at least 95% and even 100% methyl formate and that in an amount varying from 1 to 30 parts by weight for 100 parts by weight polyol.

As chemical blowing means use is advantageously made of 0.5 to 5.5 parts by weight water or 0.1 to 5 parts by weight formic acid for 100 parts by weight polyol, wherein preference is given to a formulation wherein as chemical blowing agent at least 3.5 parts by weight water or an equivalent amount of other chemical blowing agent for 100 parts by weight polyol are used.

Hereby there can be mentioned that with respect to foam formulations described in the above mentioned U.S. Pat. No. 3,789,315, a much larger concentration range of water in the formulation is allowed according to the invention. Indeed in that U.S. Pat. No. preference is strongly given to formulations which comprise at the highest 3.5 parts by weight water to 100 parts by weight polyol.

With foam formulations with more than 3.5 parts by weight water for 100 parts by weight polyol, there can thus be obtained polyurethane foam with a density of less than 20 kg per cubic meter.

Further, preference is given, for the reactions between polyether-polyol, polyisocyanates and chemical blowing agent, to a catalytic system which consists of either the combination of a conventional organic metal catalyst, for example an organic tin compound, wherein the amount varies between 0.05 and 0.5 parts by weight for 100 parts polyol and a conventional amine catalyst, of which the amount is comprised between 0.01 and 0.9 parts by weight for 100 parts polyol together with 0.1 to 3 parts by weight cross-linker/extender for 100 parts polyol.

Another appropriate combination is the one of said organic metal catalyst with 0.05 to 1 part by weight of said amine catalyst with delayed action for 100 parts polyol.

In the examples given hereunder use was more specifically made of the following raw materials:

(1) Polyether-polyols

P1 is a traditional polyether-polyol with a mean molecular weight of 3300 and an OH No. 49–53 and was manufactured by poly-addition of ethylene and propylene oxyde on glycerol. P1 comprises practically no primary OH groups. P2 is a reactive polyether-polyol with a mean molecular weight of 3000 and an OH No. 54–58 obtained by poly-addition of ethylene and propylene oxide on glycerol and comprises typically 50% primary hydroxyl groups.

(2) Organic polyisocyanates

I1 is a mixture of 80% by weight of 2,4-toluene-diisocyanate and 20% by weight of 2,6-toluene diisocyanate (T80). I2 is a mixture of 65% by weight of 2,4-toluene dissocyanate and 35% by weight of 2,6-toluene diisocyanate (T65). K=isocyanate index and indicates the excess of isocyanate with respect to the theoretical necessary amount and can vary between 90 and 120.

(3) Catalysts and cross-linkers/extenders

As conventional and special catalysts and cross-linkers/extenders use was made of:
SO: stannous tin octoate
A1: a mixture of 70% by weight of bis-(2-dimethylaminoethyl)-ether and 30% by weight dipropylene glycol
DABCO 33LV: a mixture of 33% by weight triethylenediamine and 67% by weight dipropylene glycol
DMAE: dimethylethanolamine
U: an amine catalyst with delayed action
Glycerol as "cross-linker/extender".

(4) Stabilizing agents

The used foam stabilizing agents are polydimethylsiloxane polyether copolymers, commercially available as SC162 or B4900.

(5) Blowing agent chemical: water
physical: R11: trichlorofluoromethane
MC: methylene chloride
MF: methy formate In Table I an overview is given of the used test method for the physical and mechanical characteristics of the foam.

EXAMPLE 1

In this example there is demonstrated that it is impossible to replace R11 by an equivalent amount of MF without applying the modification on the formulation as described in this invention. The basic formulations for those experiments are given in table 2 and the results in tables 3 and 4.

For a flexible polyurethane foam it is extremely important that the air resistance is sufficiently low, but also that the physical cell structure does not show splits.

Open foam is generally indicated on the contrary to closed foam which has a high air resistance.

Practically, there can be started from completely open foam (with splits and even collapsed areas) to completely closed foam (shrinkage) by varying the amount of tin catalyst in the formulation.

In real production circumstances it is then also important to have a wide concentration zone, wherein the amount of tin catalyst can vary in order to optimally control the openess of the foam, in function of other possible process variations.

This zone is here indicated by the SO latitude and the experiments in the example are meant to compare the SO-margin of the four proposed formulations.

The experiments were realized such as described hereunder: to 200 g polyol P1 there has been successively added in an adapted amount of water, amine catalysts, foam stabilizing agents and possibly glycerol. A 1/10 solution of stannous tin octoate in polyol has then been added to the mixture, after which that mixture has been mixed during 10 seconds with a stirrer at 2000 rpm. Thereafter a mixture of isocyanates and physical blowing agent (R11 or MF) has been added and further mixed during 7 seconds. That reaction mixture has been poured out in a cardboard box with dimensions of 250×250×250 mm.

The foaming of the reaction mixture has thereafter been carefully visually followed and the rising time at the end of the expansion has been noted. Thereafter the density and the air resistance of the foams have been determined, even as the physical characteristics of the representative experiments, such as CLD-hardness and of compression sets at 90, 75 and 50% compression. According to the criteria for acceptable air flow of the foams, we can resume the processability (or SO-latitude) for the four tested formulations as follows:

| Formulation | SO-Latitude | X |
|---|---|---|
| A | 0.15–0.25 | 4 |
| B | — | — |
| C | 0.125–0.25 | 5 |
| D | 0.3–0.4 | 4 |

X=the number of steps of 0.025 parts of SO within the SO-latitude.

We can see that as well the addition of glycerol as the substitution of the conventional amine catalyst by amine catalysts with delayed action results in a processability with pure methyl formate which is at least as good as the one of the formulations with pure R11. With foam formulations with pure methyl formate and without these adaptions, it is impossible to obtain an acceptable foam (i.e. without splits). This has been confirmed in the U.S. Pat. No. 3,879,315 wherein the sole example with pure methyl formate (example IV, table VIII, foam number 5) splits have also been noticed.

In table 4 results are given of the measurements which have been realized on representative hand mixed foam samples.

From the results it follows that the compression sets with methyl formate as a blowing agent are worse compared to R11 as blowing agent. In the following examples, it has been proved that this can be improved by maintaining a sufficiently high isocyanate index.

EXAMPLE 2

On a pilot machine foam blocks have been produced.
The conditions and the block dimensions are represented in Table 5.

In Table 6 an overview is given of the formulations and characteristics on the representative foam blocks. As can be seen the variation of the isocyanate index (K) has a great influence on the compression sets of the foam. Acceptable mechanical and comfort characteristics were obtained with methyl formate as a blowing agent by an isocyanate index of 110 compared to CCl₃F as a blowing agent by an index of 104. In the last case E, also the density and the hardness were comparable. For the same density one needs an amount of methyl formate which is nearly half of the amount of R11 in a conventional situation.

EXAMPLE 3

In Table 7 the formulations and the characteristics are given of a comparison between moulded foams on the basis of R11 and MF.

After replacement of R11 by an equivalent amount of MF and an addition of 0.6 parts glycerol, or an addition of 0.3 parts glycerol and replacement of the conventional amine catalysts by amine catalysts with a delayed action, comparable characteristics of the foam have been obtained.

EXAMPLE 4

On the pilot machine (see example 2), foam blocks have been produced. In that example, it has been shown that the method according to the invention can be used for a large variety of flexible polyurethane foams. In the formulations C and D, methylene/chloride has also been used as additional physical blowing agent. Formulations and characteristics are represented in Table 8.

TABLE 1

Used standards for determining the physical foam characteristics

| CHARACTERISTIC | UNIT | STANDARD |
|---|---|---|
| Net density | Kg/M³ | ISO 845 |
| ILD - hardness | N | ISO 2439B |
| Sag factor (SF) | — | ILD 65%/ILD 25% |
| CLD - hardness | kPa | ISO/DIS 3386 |
| Elongation at break | % | ISO 1798 |
| Tensile strength | kPa | ISO 1798 |
| Tear resistance | N/cm | ASTM D3574 |
| Resilience | % | ASTM D3574 |
| Compression sets | % | ISO 1856B |
| Air resistance (1) | cm H₂O | internal Recticel method |

(1) The internal Recticel method for determining the air resistance of flexible polyurethane foam has as object to quantify the open/closed cell characteristics of the foam.

Through a foam sample having the dimensions of 400×400×100 air is blown by means of a thin tube in a plate, at a pressure of 1.5 bar and a throughput of 250 ml/sec.

The resistance which is felt by the air in order to cross the foam sample is transmitted on a water column, where the so-called air resistance is read in cm-water.

TABLE 2

Formulations example 1.

| FORMULATION | A | B | C | D |
|---|---|---|---|---|
| (1) P1 | 100 | 100 | 100 | 100 |
| (2) Total water | 3,9 | 3,9 | 3,9 | 3,9 |
| K | 104 | 104 | 104 | 104 |
| (3) Glycerol | — | — | 0,5 | — |
| (4) I1 | 47,4 | 47,4 | 48,9 | 47,4 |
| (5) DABCO 33LV | 0,6 | 0,6 | 0,6 | — |
| (6) U | — | — | — | 0,4 |
| (7) SC 162 | 2,0 | 2,0 | 2,0 | 2,0 |
| (8) SO | var. | var. | var. | var. |
| (9) R-11 | 25 | — | — | — |
| (10) MF | — | 12,5 | 12,5 | 12,5 |

TABLE 3

Results Example 1

| SO | 0,1 | 0,125 | 0,15 | 0,175 | 0,2 | 0,25 | 0,30 | 0,35 | 0,4 | 0,45 |
|---|---|---|---|---|---|---|---|---|---|---|
| A: 25 parts R-11 | | | | | | | | | | |
| RT | — | 170 | 157 | 144 | 137 | 130 | 122 | 115 | — | — |
| AR | — | * | 2–4 | 3–5 | 4–7 | 7–13 | >30 | >30 | — | — |
| RG | — | — | 15,9 | 15,8 | 15,6 | 15,1 | 14,7 | 14,2 | — | — |
| B: 12,5 parts MF | | | | | | | | | | |
| RT | — | — | — | — | — | 125 | 118 | 112 | 108 | — |
| AR | — | — | — | — | — | 2–5* | 3–7* | 5–11* | 8–12* | — |
| C: 12,5 parts MF + 0,5 parts glycerol | | | | | | | | | | |
| RT | 200 | 180 | 150 | 142 | 130 | 125 | 120 | 113 | — | — |
| AR | * | 2–4 | 2–5 | 3–4 | 3–6 | 7–11 | 12—24 | >30 | — | — |
| RG | — | 15,7 | 15,5 | 15,6 | 15,5 | 15,4 | 15,0 | 14,5 | — | — |
| D: 12,5 parts MF + 0,4 parts U replacing 0,6 parts DABCO 33LV | | | | | | | | | | |
| RT | — | — | — | — | — | 150 | 135 | 124 | 115 | 111 |
| AR | — | — | — | — | — | * | 1–2 | 2–3 | 3–5 | 10–18 |
| RG | — | — | — | — | — | — | 15,4 | 15,5 | 5,1 | 14,8 |

SO = parts of stannous octate
RT = rise time in seconds
AR = air resistance in cm H₂O according to the internal Recticel method. According to this method and for this type of foam these values have to be <10 for an acceptable air permeability.
RG = netto foam density in kg/cm³
*splits

TABLE 4

Measured physical properties Example 1.

| FORMULATIONS | A | C |
|---|---|---|
| RG (kg/m³) | 15.6 | 15.5 |
| CLD 25% | 0.9 | 0.75 |
| 40% (kPa) | 1.0 | 0.9 |
| 60% | 1.6 | 1.4 |
| CS 90% | 50 | 75 |

TABLE 4-continued

Measured physical properties Example 1.

| FORMULATIONS | A | C |
|---|---|---|
| 75% (%) | 6.4 | 11.5 |
| 50% | 5.0 | 6.5 |
| AR (cm H$_2$O) | 4-7 | 3-6 |

TABLE 5

| | |
|---|---|
| Machine type | high pressure |
| Polyol throughput | 12 kg/min |
| Raw material temperatures | RT |
| Stirrer speed | 3000 RPM |
| Mixing chamber pressure | 300 gr/cm$^2$ |
| Conveyor angle | 2.5 degrees |
| Block width | 100 cm |
| Block height | 40 cm |

TABLE 6

Formulations and properties Example 2

| FORMULATION | A | B | C | D | E |
|---|---|---|---|---|---|
| P1 | 100 | 100 | 100 | 100 | 100 |
| Glycerol | — | 0,5 | 0,5 | 0,5 | 0,5 |
| Total water | 3,9 | 3,9 | 3,9 | 3,8 | 3,8 |
| K | 104 | 102 | 104 | 108 | 110 |
| I1 | 47,4 | 48,9 | 49,9 | 50,7 | 51,6 |
| A1 | 0,1 | 0,1 | 0,1 | 0,1 | 0,1 |
| DABCO 33LV | 0,3 | 0,3 | 0,3 | 0,3 | 0,3 |
| B4900 | 2,0 | 2,0 | 2,0 | 2,0 | 2,0 |
| SO | 0,2 | 0,225 | 0,25 | 0,175 | 0,175 |
| R-11 | 25 | — | — | — | — |
| MF | — | 12,5 | 12,5 | 12,0 | 12,0 |
| Rise time (sec.) | 105 | 100 | 100 | 110 | 110 |
| Netto density (kg/m$^3$) | 14,0 | 13,8 | 14,2 | 14,1 | 14,4 |
| CLD 25% | 1,0 | 0,7 | 0,8 | 0,9 | 1,0 |
| 40% (kPa) | 1,1 | 0,8 | 0,9 | 1,0 | 1,1 |
| 60% | 1,6 | 1,3 | 1,4 | 1,6 | 1,8 |
| ILD 25% | 38 | 28 | 32 | 36 | 39 |
| 40% (N) | 45 | 35 | 40 | 44 | 48 |
| 65% | 83 | 69 | 77 | 84 | 91 |
| SF | 2,2 | 2,5 | 2,4 | 2,3 | 2,3 |
| Elongation at break | 210 | 245 | 215 | 200 | 150 |
| Tensile strength (kPa) | 55 | 50 | 50 | 55 | 45 |
| Tear resistance (N/cm) | 3,5 | 3,4 | 3,1 | 3,0 | 2,7 |
| Resistance (%) | 45 | 43 | 43 | 43 | 44 |
| Air resistance (cm H$_2$O) (min.-max.) | 1-2 | 1-2 | 1-3 | 1-2 | 1-2 |
| CS 90% (%) | 6,1 | 27,0 | 12,9 | 14,2 | 8,5 |
| 75% | 4,0 | 13,0 | 6,3 | 8,5 | 5,6 |

TABLE 7

Formulations and properties Example 3.

| FORMULATION | A | B | C |
|---|---|---|---|
| P2 | 100 | 100 | 100 |
| Glycerol | — | 0,6 | 0,3 |
| Total water | 3,5 | 3,5 | 3,5 |
| K | 104 | 109 | 109 |
| I1 | 44,2 | 36,2 | 35,5 |
| I2 | — | 12,1 | 11,8 |
| DABCO 33LV | 0,1 | 0,1 | — |
| A1 | 0,05 | 0,05 | — |
| U | — | — | 0,5 |
| B4900 | 1,9 | 1,9 | 1,9 |
| SO | 0,20 | 0,15 | 0,14 |
| R-11 | 10 | — | — |
| MF | — | 4,5 | 4,5 |
| Demoulding time (min.) | 10 | 11 | 10 |
| Oven temperature (C.°) | 185 | 185 | 185 |
| Density (kg/m$^3$) | 29,5 | 29,7 | 29,2 |
| ILD 25% | 69 | 67 | 62 |
| 40% (N) | 85 | 83 | 79 |
| 65% | 139 | 144 | 138 |
| SF | 2,0 | 2,1 | 2,2 |

TABLE 8

Formulations and properties Example 4

| FORMULATION | A | B | C | D | E | F |
|---|---|---|---|---|---|---|
| P1 | 100 | 100 | 100 | 100 | 100 | 100 |
| Glycerol | — | 0,7 | — | 0,5 | — | 0,3 |
| Total water | 5,2 | 5,2 | 3,1 | 2,9 | 2,5 | 2,4 |
| K | 113 | 116 | 104 | 112 | 102 | 108 |
| I1 | 65,8 | 70,1 | 39,4 | 42,7 | 32,7 | 35,8 |
| A1 | 0,07 | 0,07 | 0,08 | 0,08 | 0,1 | 0,1 |
| DABCO 33LV | 0,09 | 0,09 | 0,15 | 0,15 | 0,3 | 0,3 |
| DMAE | 0,1 | 0,1 | 0,1 | 0,1 | — | — |
| SC162 | 1,8 | 1,8 | 2,0 | 2,0 | 1,8 | 1,8 |
| SO | 0,25 | 0,15 | 0,28 | 0,15 | 0,2 | 0,2 |
| R-11 | 20 | — | 8 | — | 14 | — |
| MC | — | — | 5,5 | 4,7 | — | — |
| MF | — | 9 | — | 4,7 | — | 7 |
| Rise time (sec.) | 90 | 105 | 125 | 120 | 150 | 130 |
| Netto density (kg/m$^3$) | 13,5 | 14,0 | 18,8 | 18,7 | 22,5 | 23 |
| CLD 25% | 1,9 | 1,8 | 0,9 | 0,9 | 0,9 | 1,1 |
| 40% (kPa) | 2,1 | 2,1 | 1,0 | 1,0 | 1,0 | 1,2 |
| 60% | 3,4 | 3,3 | 1,7 | 1,6 | 1,7 | 2,0 |
| ILD 25% | 74 | 66 | 40 | 37 | 35 | 46 |
| 40% (N) | 91 | 85 | 48 | 46 | 44 | 55 |
| 65% | 176 | 158 | 89 | 84 | 83 | 103 |
| SF | 2,4 | 2,4 | 2,2 | 2,3 | 2,3 | 2,2 |
| Air resistance (cm H$_2$O) (min-max) | 1-3 | 1-2 | 2-3 | 2-3 | 3-5 | 2-4 |
| CS 90% | 9,4 | 8,7 | 6,5 | 6,3 | 8,4 | 3,9 |
| 75% | 5,9 | 6,1 | 4,7 | 4,2 | 8,2 | 3,0 |

What is claimed is:

1. A method for preparing a flexible polyurethane foam wherein a polyether-polyol having an average molecular weight of from 1000 to 8000 and an average functionality not larger than 4 is reacted with an organic polyisocyanate in the presence of a foam stabilizer, a catalyst and a blowing agent comprising at least 50% methyl formate, wherein a cross-linker/extender in an amount of from 0.1 to 3 parts per 100 parts polyol and/or an amine catalyst with a delayed action is added to said reaction mixture comprising said components.

2. A method as claimed in claim 1, wherein a cross-linker/extender is used which comprises a compound having a molecular weight not larger than 400 and a functionality of at least 2 and 8 at the highest.

3. A method as claimed in claim 2, wherein a cross-linker/extender is used which comprises glycerol, trimethylolpropane, ethylene glycol, propylene glycol, diethylene glycol, dipropylene glycol, triethanolamine and/or alkylene oxide poly-addition products thereof.

4. A method as claimed in claim 2, wherein a cross-linker/extender is used which comprises a compound having a functionality of at least 2 concerning at least one functional NH or NH$_2$ group and at least one functional OH-group.

5. A method as claimed in claim 4, wherein a cross-linker/extender is used which comprises monoethanolamine, diethanolamine, di-isopropanolamine and/or alkylene/oxide poly- addition products thereof.

6. A method as claimed in claim 2, wherein a cross-linker/extender is used which comprises a compound having a functionality of at least 2 concerning at least two functional NH or NH$_2$-groups, such as polyamines and/or alkyle oxide poly-addition products thereof.

7. A method as claimed in claim 1, wherein said cross-linker/extender is used in quantities varying from 0.3 to 0.7 part by 100 parts polyol.

8. A method as claimed in claim 1, wherein an amine catalyst is used, which comprises an amine being at least partially neutralized with carboxylic acid, wherein said carboxylic acid reacts with isocyanate or with primary amine groups present in said reaction mixture thus liberating the amine as catalyst.

9. A method as claimed in claim 1, wherein a heat sensible amine catalyst is used, the catalyst activity thereof increasing with increasing temperature.

10. A method as claimed in claim 1, wherein said amine catalyst is used in quantities varying from 0.05 to 1 part by weight for 100 parts polyol.

11. A method as claimed in claim 1, wherein an excess of isocyanate is used having an isocyanate index higher than 100 and preferably comprised between 105 and 115.

12. A method as claimed in claim 1, wherein 1 to 30 parts by weight for 100 parts by weight polyol are added as physical blowing agent which, beside methyl formate, comprises a partially or completely halogenated hydrocarbon, wherein the methylformate concentration in the physical blowing agent is at least 50% by weight.

13. A method as claimed in claim 12, wherein at least 95% methyl formate is used in said physical blowing agent.

14. A method as claimed in claim 13, wherein as physical blowing agent use is made of 1 to 30 parts by weight of pure methyl formate for 100 parts by weight polyol.

15. A method as claimed in claim 1, wherein a chemical blowing agent is used which comprises 0.5 to 5.5 parts by weight water and/or 0.1 to 5 parts by weight formic acid for 100 parts by weight polyol.

16. A method as claimed in claim 1, wherein a catalyst system is applied which comprises at least 0.05 to 0.5 part by weight for 100 parts by weight polyol of an organic metal catalyst, such as a tin catalyst in combination with, on the one hand, 0.01 to 0.9 part by weight for 100 parts by weight polyol of an amine catalyst and 0.1 to 3 parts by weight for 100 parts by weight polyol of said cross-linker/extender or, on the other hand, 0.05 to 1 part by weight of said amine catalyst with delayed action for 100 parts by weight polyol.

17. A method as claimed in claim 1, wherein use is made, as foam stabilizer, of 0.2 to 3% by weight for 100 parts by weight polyol of a silicon surfactant.

* * * * *